United States Patent
Agnihotri et al.

(10) Patent No.: US 7,599,554 B2
(45) Date of Patent: Oct. 6, 2009

(54) METHOD AND APPARATUS FOR SUMMARIZING A MUSIC VIDEO USING CONTENT ANALYSIS

(75) Inventors: Lalitha Agnihotri, Tarrytown, NY (US); Nevenka Dimitrova, Pelham Manor, NY (US); John Kender, Leonia, NJ (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 572 days.

(21) Appl. No.: 10/552,829

(22) PCT Filed: Apr. 2, 2004

(86) PCT No.: PCT/IB2004/001068

§ 371 (c)(1),
(2), (4) Date: Oct. 13, 2005

(87) PCT Pub. No.: WO2004/090752

PCT Pub. Date: Oct. 21, 2004

(65) Prior Publication Data

US 2006/0210157 A1    Sep. 21, 2006

Related U.S. Application Data

(60) Provisional application No. 60/462,777, filed on Apr. 14, 2003, provisional application No. 60/509,800, filed on Oct. 8, 2003.

(51) Int. Cl.
*G06K 9/34* (2006.01)
(52) U.S. Cl. ..................... 382/173
(58) Field of Classification Search ............ 382/173, 382/175, 176, 180–181, 190–191, 224–228, 382/236, 254, 282, 305–306; 386/46, 52, 386/83, 96; 704/278; 348/402.1, 407.1, 348/413.1–414.1, 416.1–418.1, 422.1, 430.1–431.1; 375/240.16; 707/104.1; 715/716
See application file for complete search history.

(56) References Cited

U.S. PATENT DOCUMENTS 5,805,733 A    9/1998    Wang (Continued)

FOREIGN PATENT DOCUMENTS

WO    WO 00/45291    8/2000
WO    WO 04/001626 A1    12/2003

OTHER PUBLICATIONS

"Integrated Multimedia Processing for Topic Segmentation and Classification", by R.S. Jasinschi et al., pp. 366-369.

(Continued)

*Primary Examiner*—Jose L Couso

(57) ABSTRACT

A method and apparatus are provided for segmenting and summarizing a music video (507) in a multimedia stream (505) using content analysis. A music video (507) is segmented in a multimedia stream (505) by evaluating a plurality of content features that are related to the multimedia stream. The plurality of content features includes at least two of a face presence feature; a videotext presence feature; a color histogram feature; an audio feature, a camera cut feature; and an analysis of key words obtained from a transcript of the at least one music video. The plurality of content features are processed using a pattern recognition engine (1000), such as a Bayesian Belief Network, or one or more video segmentation rules (1115) to identify the music video (507) in the multimedia stream (505). A chorus is detected in at least one music video (507) using a transcript (T) of the music video (507) based upon a repetition of words in the transcript. The extracted chorus may be employed for the automatic generation of a summary of the music video (507).

29 Claims, 10 Drawing Sheets

U.S. PATENT DOCUMENTS

| | | | |
|---|---|---|---|
| 6,137,544 | A | 10/2000 | Dimitrova |
| 6,614,930 | B1 | 9/2003 | Agnihotri |
| 7,027,124 | B2 * | 4/2006 | Foote et al. .................... 352/1 |
| 7,127,120 | B2 * | 10/2006 | Hua et al. ................... 382/254 |
| 7,158,676 | B1 * | 1/2007 | Rainsford .................. 382/190 |
| 7,158,685 | B2 * | 1/2007 | Guenter ...................... 382/261 |
| 7,336,890 | B2 * | 2/2008 | Lu et al. ....................... 386/96 |
| 2002/0037083 | A1 | 3/2002 | Weare |

OTHER PUBLICATIONS

"Personalizing Video Recorders using Multimedia Processing and Integration", by N. Dimitrova et al., pp. 564-567.

"Audio-Visual Query and retrieval: A System that uses Dynamic Programming and Relevance Feedback", by M. Naphade et al., Journal of Electronic Imaging, vol. 10, No. 4.

"Automatic Music Summarization via Similarity Analysis", by Matthew Cooper et al.

"Automatically Generating Summaries for Musical Video" by Xi Shao et al., Institute for Infocomm Research.

* cited by examiner

METHOD AND APPARATUS FOR SUMMARIZING A MUSIC VIDEO USING CONTENT ANALYSIS

CROSS REFERENCE TO RELATED APPLICATION

This application claims the benefit of U.S. Provisional Application No. 60/462,777, filed Apr. 14, 2003 and U.S. Provisional Application No. 60/509,800, filed Oct. 8, 2003; and is related to U.S. patent application Ser. No. 09/441,943, entitled "Video Stream Classifiable Symbol Isolation Method and System" filed on Nov. 17, 1999, each incorporated by reference herein.

The present invention relates to video summarization techniques, and more particularly, to methods and apparatus for indexing and summarizing music videos.

Music video programming is available on a number of television channels, including Fuse, VH1, MTV and MTV2. While a number of popular web sites, such as www.buymusic.com, allow a user to browse for and obtain the audio portions of individual songs, video recorders and other video-based applications only allow a user to obtain an entire program, including programs with multiple music videos. There is currently no way to automatically obtain individual music videos. Thus, if a viewer records an entire program that includes one or more music videos, the recording will include all the non-music video portions as well, such as advertisements and commentary. To view the music videos, the viewer must fast forward the recording through the non-music video portions, until the desired music video portion is reached. In addition, a large amount of recording capacity of the video playback device is used recording unwanted material, such as advertisements and other talking.

Content analysis methods have been proposed or suggested to provide high level access to specific portions of a program, such as the highlights portions. Video summarization methods have been developed for many types of programming, including news, sports and movies. The "InforMedia Project," for example, is a digital video library system that creates a short synopsis of each video primarily based on speech recognition, natural language understanding, and caption text. See, A. Hauptmann and M. Smith, "Text, Speech, and Vision for Video Segmentation: The Informedia Project," American Association for Artificial Intelligence (AAAI), Fall, 1995 Symposium on Computational Models for Integrating Language and Vision (1995).

Research in the area of music analysis and retrieval, however, has focused largely on the audio aspects. For example, B. Logan and S. Chu, "Music Summarization Using Key Phrases," Int'l Conf. on Acoustics, Speech and Signal Processing, 2000, discloses algorithms for finding key phrases in selections of popular music for generating audio thumbnails. J. Foote, "Visualizing Music and Audio Using Self Similarity," Proc. ACM Multimedia '99, 77-80, November 1999, introduced audio "gisting," as an application of a measure of audio novelty. This audio novelty score is based on a similarity matrix, which compares frames of audio based on features extracted from the audio. Thus, while music content analysis is an active area of research, a need still exists for improved techniques for the analysis and summarization of music videos. A further need exists for methods and apparatus that segment music videos in a multimedia data stream and prepare a summary of each music video that includes relevant music video information.

Generally, a method and apparatus are provided for segmenting and summarizing a music video in a multimedia stream using content analysis. A music video is segmented in a multimedia stream in accordance with the present invention by evaluating a plurality of content features that are related to the multimedia stream. The plurality of content features includes at least two of a face presence feature; a videotext presence feature; a color histogram feature; an audio feature, a camera cut feature; and an analysis of key words obtained from a transcript of the at least one music video. The plurality of content features are processed using a pattern recognition engine, such as a Bayesian Belief Network, or one or more video segmentation rules to identify the music video in the multimedia stream.

According to one aspect of the invention, a face presence feature evaluates patterns in the presentation of faces in the multimedia stream. Initially, one of several possible face type labels is assigned to each image frame. The image frames are then clustered based on the assigned face type labels and patterns are analyzed in the clusters of face type labels to detect video boundaries. According to another aspect of the invention, a color histogram feature evaluates patterns in the color content of the multimedia stream. A color histogram is obtained for each image frame and the image frames are then clustered based on the histograms. Patterns are analyzed in the clusters of histograms to detect video boundaries. A camera cut feature evaluates patterns in the camera cuts and movements in a multimedia stream. An audio feature is disclosed to evaluate patterns in the audio content of the multimedia stream. For example, a volume of the multimedia stream can be evaluated to detect the start and finish of a song, as indicated by an increasing and decreasing volume, respectively.

According to another aspect of the invention, a chorus is detected in at least one music video. A transcript associated with a music video in a received multimedia stream is accessed and the chorus is detected based upon a repetition of words in the transcript. The transcript may be obtained, for example, from closed caption information. The extracted chorus may be employed for the automatic generation of a summary of the music video. The generated summary can be presented to a user in accordance with user preferences, and may be used to retrieve music videos in accordance with user preferences.

A more complete understanding of the present invention, as well as further features and advantages of the present invention, will be obtained by reference to the following detailed description and drawings.

Figure 12:
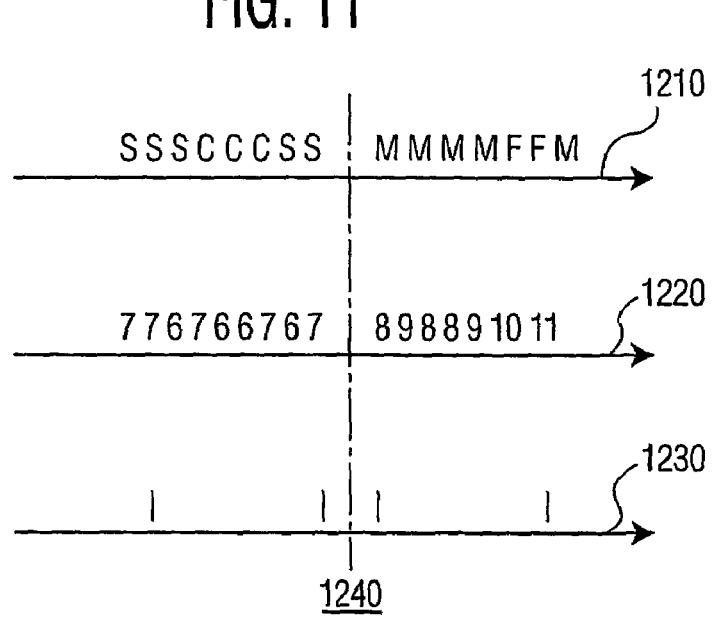
Figure 13:
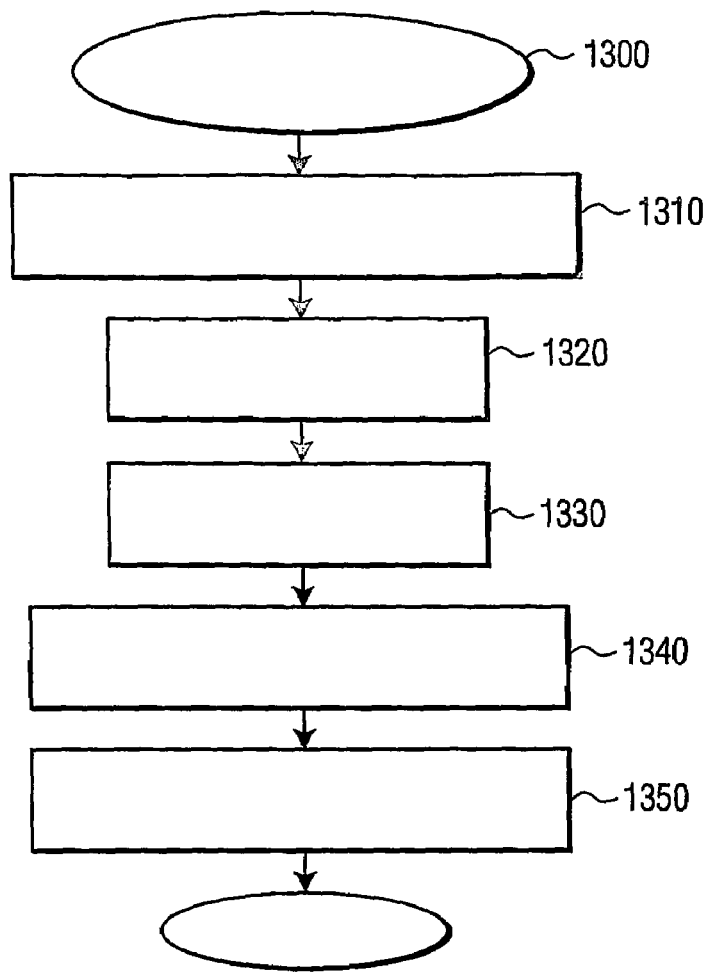
Figure 14:
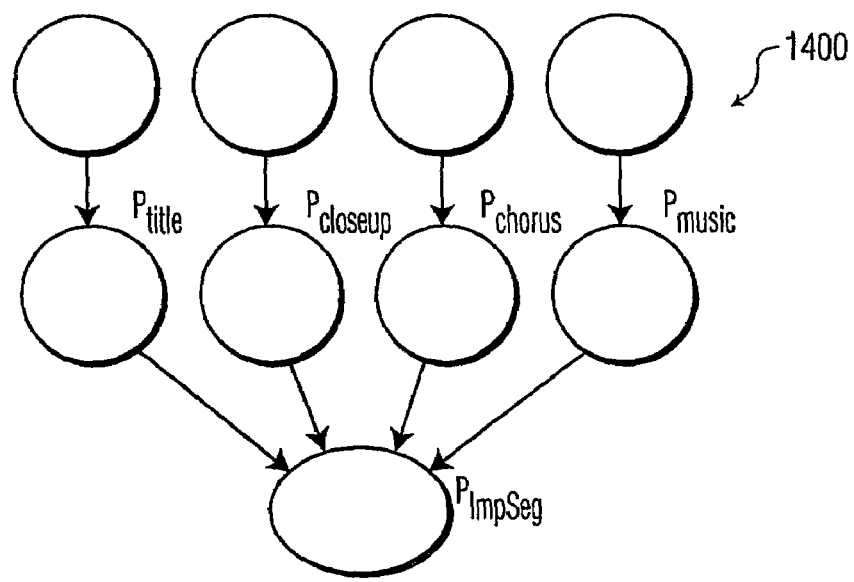

FIG. 12 provides exemplary time line images of various features monitored by the present invention;

FIG. 13 is a flow chart of an exemplary implementation of a chorus detection process; and FIG. 14 shows a Bayesian Belief Network that can be used to find elements from a video in order to automatically generate a summary.

Figure 1:
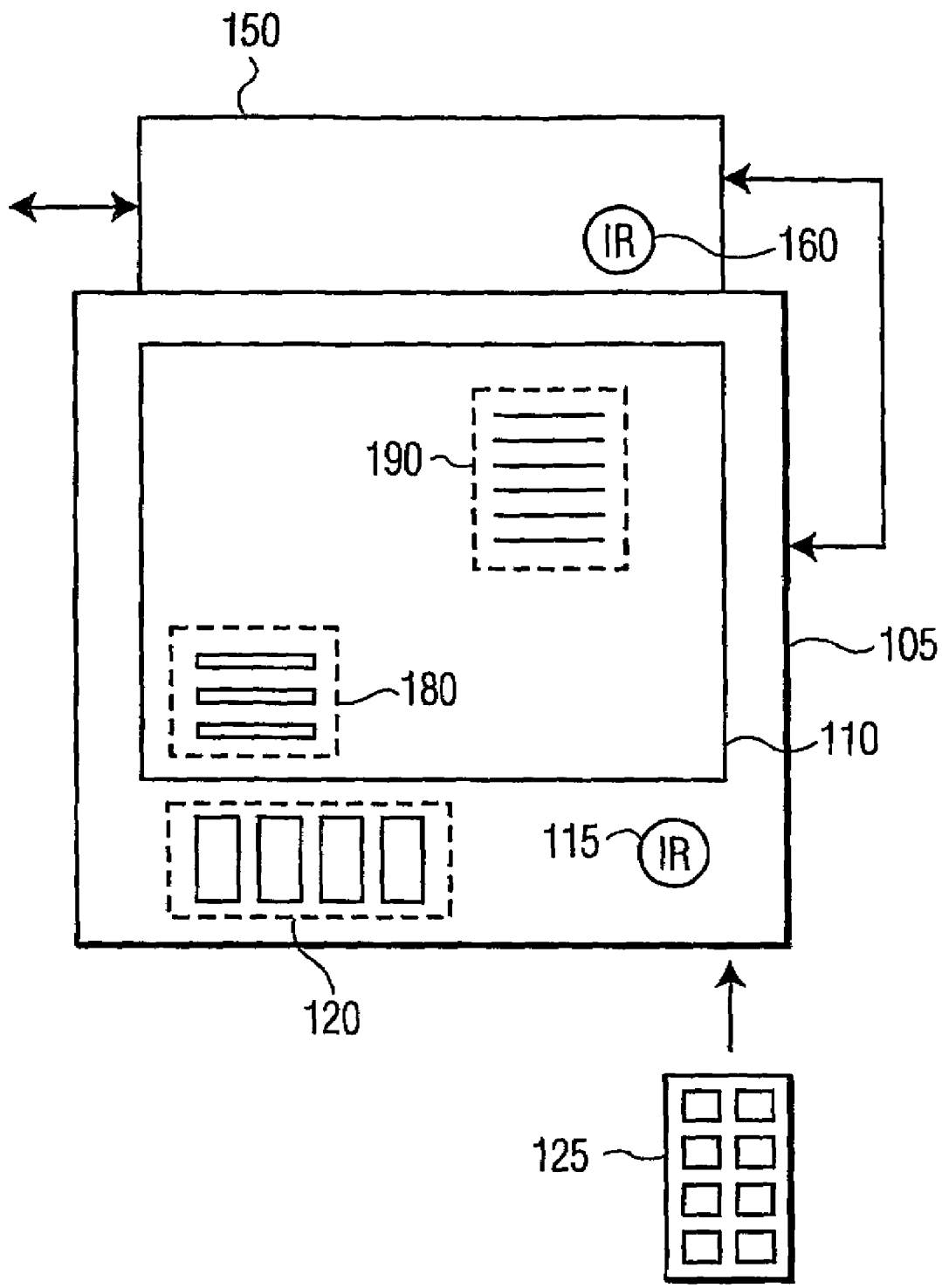
FIG. 1 illustrates an exemplary conventional video display system in which the present invention can operate.

FIG. 1 illustrates exemplary video playback device 150 and television set 105 according to one embodiment of the present invention. Video playback device 150 receives incoming television signals from an external source, such as a cable television service provider, a local antenna, an Internet service provider (ISP), a DVD or VHS tape player. Video playback device 150 transmits television signals from a viewer selected channel to television set 105. A channel may be selected manually by the user or may be selected automatically by a recording device previously programmed by the user. Alternatively, a channel and a video program may be selected automatically by a recording device based upon information from a program profile in the user's personal viewing history. While the present invention is described in the context of an exemplary television receiver, those skilled in the art will recognize that the exemplary embodiment of the present invention may easily be modified for use in any type of video display system.

In a Record mode, video playback device 150 may demodulate an incoming radio frequency (RF) television signal to produce a baseband video signal that is recorded and stored on a storage medium within or connected to video playback device 150. In a Play mode, video playback device 150 reads a stored baseband video signal (i.e., a program) selected by the user from the storage medium and transmits it to television set 105. Video playback device 150 may comprise a video recorder of the type that is capable of receiving, recording, interacting with, and playing digital signals.

Video playback device 150 may comprise a video recorder of the type that utilizes recording tape, or that utilizes a hard disk, or that utilizes solid state memory, or that utilizes any other type of recording apparatus. If video playback device 150 is a video cassette recorder (VCR), video playback device 150 stores and retrieves the incoming television signals to and from a magnetic cassette tape. If video playback device 150 is a disk drive-based device, such as a ReplayTV™ recorder or a TiVO™ recorder, video playback device 150 stores and retrieves the incoming television signals to and from a computer magnetic hard disk rather than a magnetic cassette tape, and retrieves stored television signals from the hard disk. In still other embodiments, video playback device 150 may store and retrieve from a local read/write (R/W) digital versatile disk (DVD) or a read/write (R/W) compact disk (CD-RW). The local storage medium may be fixed (e.g., hard disk drive) or may be removable (e.g., DVD, CD-ROM).

Video playback device 150 comprises infrared (IR) sensor 160 that receives commands (such as Channel Up, Channel Down, Volume Up, Volume Down, Record, Play, Fast Forward (FF), Reverse, and the like) from remote control device 125 operated by the user. Television set 105 is a conventional television comprising screen 110, infrared (IR) sensor 115, and one or more manual controls 120 (indicated by a dotted line). IR sensor 115 also receives commands (such as Volume Up, Volume Down, Power On, Power Off) from remote control device 125 operated by the user.

It should be noted that video playback device 150 is not limited to receiving a particular type of incoming television signal from a particular type of source. As noted above, the external source may be a cable service provider, a conventional RF broadcast antenna, a satellite dish, an Internet connection, or another local storage device, such as a DVD player or a VHS tape player. In some embodiments, video playback device 150 may not even be able to record, but may be limited to playing back television signals that are retrieved from a removable DVD or CD-ROM. Thus, the incoming signal may be a digital signal, an analog signal, or Internet protocol (IP) packets.

However, for purposes of simplicity and clarity in explaining the principles of the present invention, the descriptions that follow shall generally be directed to an embodiment in which video playback device 150 receives incoming television signals (analog and/or digital) from a cable service provider. Nonetheless, those skilled in the art will understand that the principles of the present invention may readily be adapted for use with wireless broadcast television signals, local storage systems, an incoming stream of IP packets containing MPEG data, and the like. When a music video is displayed on screen 110 of television 105, the beginning of the music video usually displays a text caption 180 (videotext) at the bottom of the video image. Text caption 180 usually contains the title of the song, the name of the album, the name of the artist or group, the date of release and other similar information. Text caption 180 is also usually displayed at the end of the music video. Text caption 180 will also be referred to as videotext block 180. Music video summary controller 270 is capable of accessing a list 190 of all of the stored music video summary files 360 and displaying the list 190 on screen 110 of television 105. That is, list 190 displays (1) music video summary files of all the music videos that have been detected in the multimedia data stream and (2) the identity of the artist or group that recorded each music video. Using remote control device 125 and IR sensor 160, the user sends a "play music video summary" control signal to music video summary controller 270 to select which music video summary file in list 190 to play next. In this manner the user selects the order in which the music video summary files are played.

Figure 2:
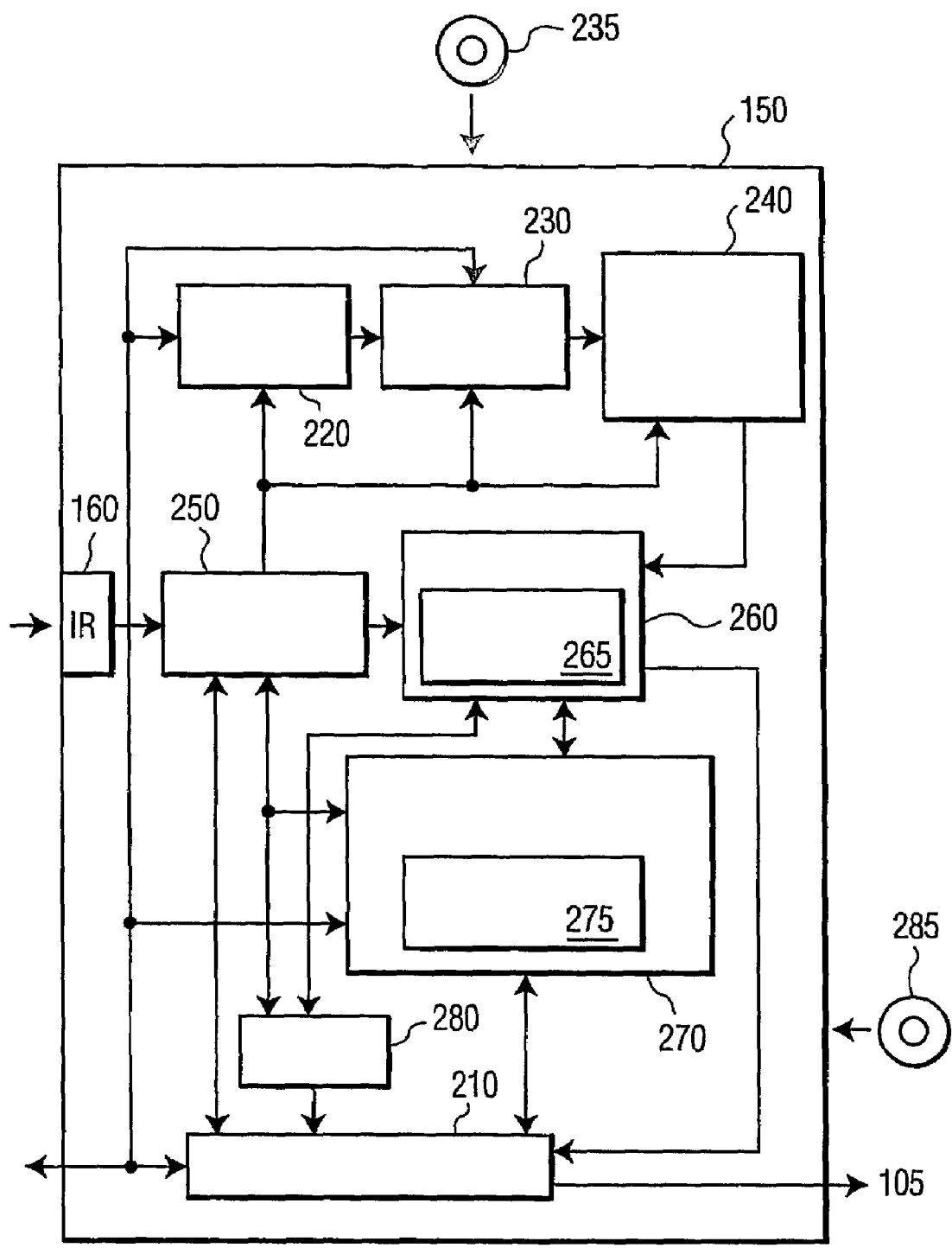
FIG. 2 illustrates a system for indexing and summarizing music videos in the exemplary video display system of FIG. 1 according to one embodiment of the invention.

FIG. 2 illustrates exemplary video playback device 150 in greater detail according to one embodiment of the present invention. Video playback device 150 comprises IR sensor 160, video processor 210, MPEG2 encoder 220, hard disk drive 230, MPEG2 decoder/NTSC encoder 240, and video recorder (VR) controller 250.

Video playback device 150 further comprises video unit 260 comprising frame grabber 265, music video summary controller 270 comprising close caption decoder 275, and memory 280. Frame grabber 265 captures and stores video frames from the output of MPEG2 decoder/NTSC encoder 240. Close caption decoder 265 decodes close caption text in the NTSC output signal of MPEG2 decoder/NTSC encoder 240. Although close caption decoder 275 is shown located within music video summary controller 270 in FIG. 2, it is not necessary for close caption decoder 275 to be located within music video summary controller 270.

VR controller 250 directs the overall operation of video playback device 150, including View mode, Record mode, Play mode, Fast Forward (FF) mode, Reverse mode, and other similar functions. Music video summary controller 270 directs the creation, storage, and playing of music video summaries in accordance with the principles of the present invention.

In View mode, VR controller 250 causes the incoming television signal from the cable service provider to be demodulated and processed by video processor 210 and transmitted to television set 105, with or without storing video signals on (or retrieving video signals from) hard disk drive 230. Video processor 210 contains radio frequency (RF) front-end circuitry for receiving incoming television signals from the cable service provider, tuning to a user-selected channel, and converting the selected RF signal to a baseband television signal (e.g., super video signal) suitable for display on television set 105. Video processor 210 also is capable of receiving a conventional NTSC signal from MPEG2 decoder/NTSC encoder 240 (after buffering in video buffer 265 of video unit 260) during Play mode and transmitting a baseband television signal to television set 105.

In Record mode, VR controller 250 causes the incoming television signal to be stored on hard disk drive 230. Under the control of VR controller 250, MPEG2 encoder 220 receives an incoming analog television signal from the cable service provider and converts the received RF signal to the MPEG2 format for storage on hard disk drive 230. Alternatively, if video playback device 150 is coupled to a source that is transmitting MPEG2 data, the incoming MPEG2 data may bypass MPEG2 encoder 220 and be stored directly on hard disk drive 230.

In Play mode, VR controller 250 directs hard disk drive 230 to stream the stored television signal (i.e., a program) to MPEG2 decoder/NTSC encoder 240, which converts the MPEG2 data from hard disk drive 230 to, for example, a super video (S-Video) signal that video processor 210 transmits to television set 105.

It should be noted that the choice of the MPEG2 standard for MPEG2 encoder 220 and MPEG2 decoder/NTSC encoder 240 is by way of illustration only. In alternate embodiments of the present invention, the MPEG encoder and decoder may comply with one or more of the MPEG-1, MPEG-2, and MPEG-4 standards, or with one or more other types of standards.

For the purposes of this application and the claims that follow, hard disk drive 230 is defined to include any mass storage device that is both readable and writable, including, but not limited to, conventional magnetic disk drives and optical disk drives for read/write digital versatile disks (DVD-RW), re-writable CD-ROMs, VCR tapes and the like. In fact, hard disk drive 230 need not be fixed in the conventional sense that it is permanently embedded in video playback device 150. Rather, hard disk drive 230 includes any mass storage device that is dedicated to video playback device 150 for the purpose of storing recorded video programs. Thus, hard disk drive 230 may include an attached peripheral drive or removable disk drives (whether embedded or attached), such as a juke box device (not shown) that holds several read/write DVDs or re-writable CD-ROMs. As illustrated schematically in FIG. 2, removable disk drives of this type are capable of receiving and reading re-writable CD-ROM disk 235.

Furthermore, in an advantageous embodiment of the present invention, hard disk drive 230 may include external mass storage devices that video playback device 150 may access and control via a network connection (e.g., Internet protocol (IP) connection), including, for example, a disk drive in the user's home personal computer (PC) or a disk drive on a server at the user's Internet service provider (ISP).

VR controller 250 obtains information from video processor 210 concerning video signals that are received by video processor 210. When VR controller 250 determines that video playback device 150 is receiving a video program, VR controller 250 determines if the video program is one that has been selected to be recorded. If the video program is to be recorded, then VR controller 250 causes the video program to be recorded on hard disk drive 230 in the manner previously described. If the video program is not to be recorded, then VR controller 250 causes the video program to be processed by video processor 210 and transmitted to television set 105 in the manner previously described.

In an exemplary embodiment of the present invention, memory 280 may comprise random access memory (RAM) or a combination of random access memory (RAM) and read only memory (ROM). Memory 280 may comprise a non-volatile random access memory (RAM), such as flash memory. In an alternate advantageous embodiment of television set 105, memory 280 may comprise a mass storage data device, such as a hard disk drive (not shown). Memory 280 may also include an attached peripheral drive or removable disk drives (whether embedded or attached) that reads read/write DVDs or re-writable CD-ROMs. As illustrated schematically in FIG. 2, removable disk drives of this type are capable of receiving and reading re-writable CD-ROM disk 285.

Figure 3:
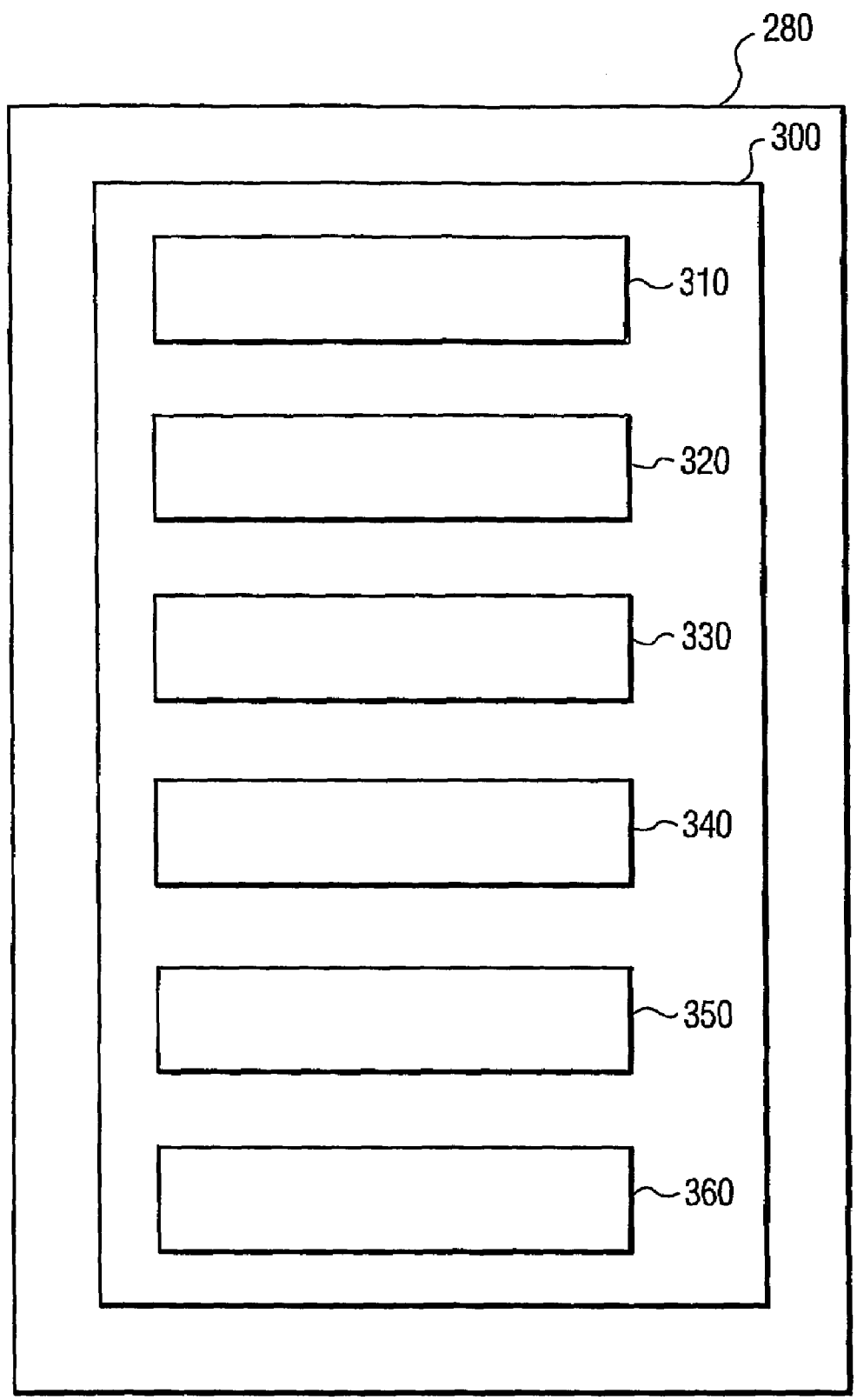
FIG. 3 illustrates a memory containing music video summary processes incorporating features of the present invention.

FIG. 3 illustrates a selected portion of memory 280 that contains music video summary computer software 300 of the present invention. Memory 280 contains operating system interface program 310, music video segmentation application 320, music video identification application 330, music video summarization application 340, music video summary blocks 350 and music video summary files 360. Music video summary controller 270 and music video summary computer software 300 together comprise a music video summary control system that is capable of carrying out the present invention. Operating system interface program 310 coordinates the operation of music video summary computer software 300 with the operating system of VR controller 250 and music video summary controller 270.

Figure 4:
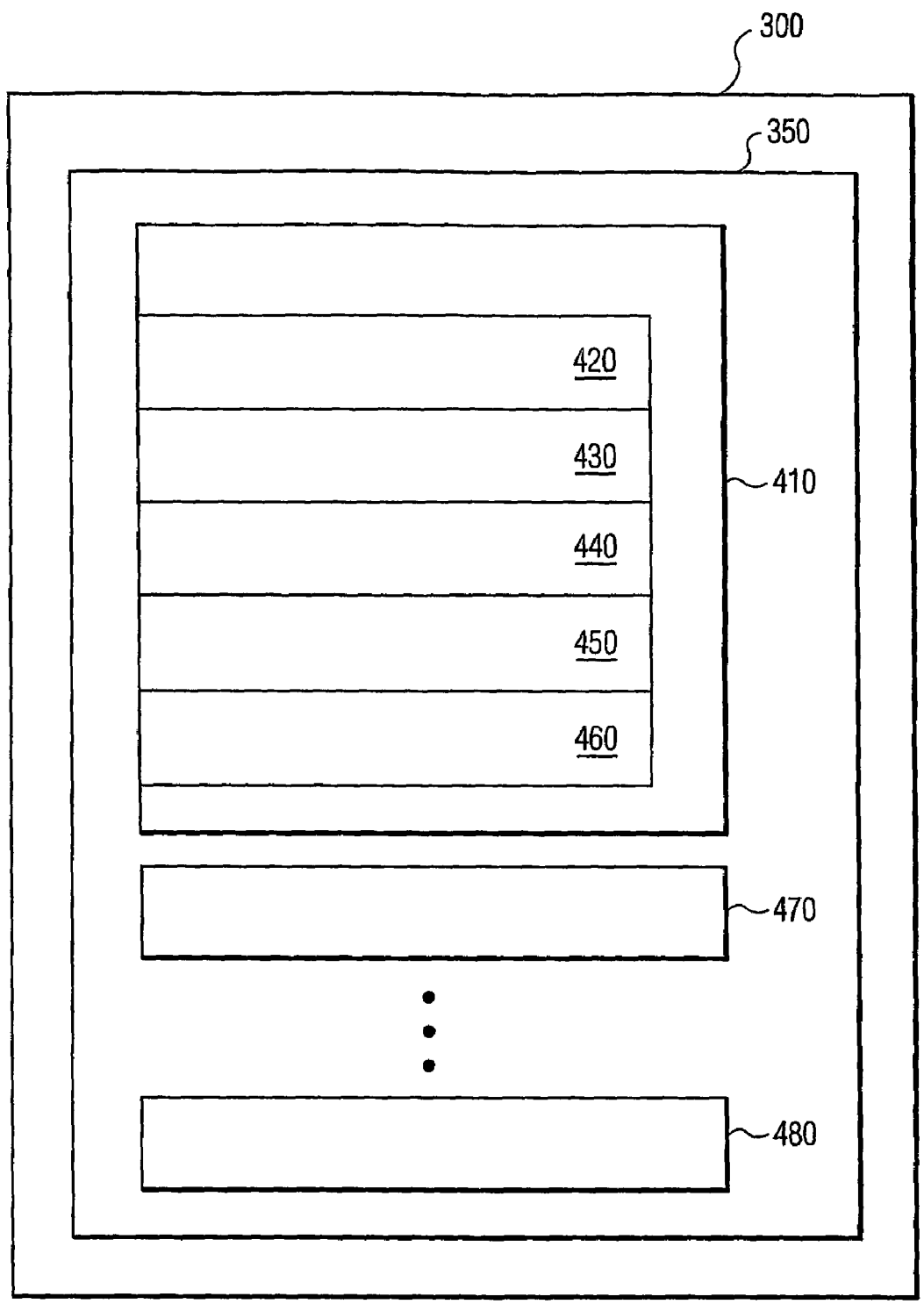
FIG. 4 illustrates a memory containing music video summary blocks that are used with an embodiment of the present invention.

FIG. 4 illustrates a group of music video summary blocks 350 as a part of an advantageous embodiment of the present invention. Music video summary controller 270 of the present invention stores information that it obtains about a music video in a music video summary block (e.g., music video summary block 410). As shown in FIG. 4, the group of music video summary blocks 350 comprises N music video summary blocks (410, 470, . . . , 480) where N is an integer. The exemplary music video summary block 410 shown in FIG. 4 illustrates the type of information that each music video summary block may contain. The exemplary music video summary block 410 contains the title, album, artist, recording studio and release date blocks 420, 430, 440, 450 and 460, respectively. These categories are illustrative and not exhaustive. That is, other types of information (not shown) may also be stored in a music video summary block of the present invention.

Assume that music video summary controller 270 receives a multimedia data stream that contains music videos. As will be more fully described below, music video summary controller 270 is capable of (1) segmenting music videos in the multimedia data stream and separating them from the remainder of the multimedia data stream, (2) identifying each segmented music video and obtaining information concerning the song that is the subject of each music video, (3) creating a music video summary file for each music video that includes text, audio and video segments, (4) storing the music video summary files, and (4) in response to a user request, displaying the music video summary files in an order selected by the user.

In one embodiment, music video summary controller 270 segments the music videos in the multimedia data stream by finding the beginning and the end of each music video. According to one aspect of the present invention, music videos are segmented using one or more image features, such as the presence of faces or the identification of faces, or one or more audio features, such as audio classification techniques to detect a change in the audio component from non-music components to music components, which typically suggests the start of a new song. In a further variation, the segmentation process employs super histograms (or color clustering techniques) to detect changes in color, such as a change from dark to bright images, which may also suggest the start of a new song.

In yet another variation, music video summary controller 270 executes computer instructions in music video segmentation application 320 to search for video text block 180 at the beginning and the end of a music video. When two video text blocks 180 are identical, then the portion of video between them represents the music video identified by the two video text blocks 180. When a music video is displayed on screen 110 of television 105, the beginning of the music video usually displays a text caption 180 at the bottom of the video image. Text caption 180 usually contains the title of the song, the name of the album, the name of the artist or group, the date of release and other similar information. Text caption 180 is also usually displayed at the end of the music video. Text caption 180 will also be referred to as videotext block 180.

When music video summary controller 270 segments a new music video, then music video summary controller 270 executes computer instructions in music video identification application 330 to extract the information that identifies the music video, for example, from a video text block 180. Music video summary controller 270 may obtain the text of video text block 180 using a method of the type disclosed in U.S. patent application Ser. No. 09/441,943, entitled "Video Stream Classifiable Symbol Isolation Method and System" filed on Nov. 17, 1999 by Lalitha Agnihotri, Nevenka Dimitrova, and Herman Elenbass.

Music video summary controller 270 may access a database (not shown) in memory 280 (or may access a database located on the Internet) to find a comprehensive list of songs, albums, artists or recording companies to compare with the information that music video summary controller 270 obtains from video text block 180. Music video summary controller 270 stores the information that it obtains concerning a music video in memory 280 in one of the music video summary blocks 350. The music video information for each separate music video is stored in a separate music video summary block (e.g., music video summary block 410).

In some cases, music video summary controller 270 may not be able to locate or identify any video text blocks 180. In such cases, music video summary controller 270 may compare a transcript of a few lines of a song with a database of transcripts of song lyrics to find a text match. Music video summary controller 270 selects a "search string" that represents the text of the few lines of a song. In one embodiment, the "search string" text may be obtained from a close caption decoder 275. Music video summary controller 270 then accesses a database of song lyrics (not shown) in memory 280 (or accesses a database of song lyrics located on the Internet such as www.lyrics.com) to find a comprehensive list of song lyrics. Music video summary controller 270 then compares the "search string" text to the transcripts of in the database of song lyrics to find the identity of the song. After the identity of the song has been determined, the name of the artist and other information can be readily accessed from the database. The method by which music video summary controller 270 searches for and locates music video information by comparing a "search string" text with a database of song lyrics will be described more fully below with reference to FIG. 7.

As previously mentioned, music video summary controller 270 obtains music video information and stores the music information in the music video summary blocks 350. Then for each music video summary block (e.g., music video summary block 410) music video summary controller 270 accesses the song lyrics and identifies a "chorus" of the song from the song lyrics. The chorus of a song is usually identified as a chorus in the database of song lyrics. Alternatively, a portion of the song lyrics that is repeated several times may also be selected to serve as the chorus of the song. This may be accomplished either by using close caption decoder 275 or by comparing portions of the audio track to find similar audio patterns. According to another aspect of the invention, the chorus portions of a music video are identified without requiring the access of a separate database by analyzing the associated transcript for repeated phrases, which often suggests the chorus. The transcript may be obtained, for example, from the close caption information.

The "chorus" of the song identifies the nature of the song to most listeners more than the first few lines of the song would. Music video summary controller 270 can then match the chorus in the transcript of song lyrics with the audio and video portions of the multimedia file that correspond to the chorus. Music video summary controller 270 then places a copy of the audio and video portions of the multimedia file that correspond to the chorus in a music video summary file 360.

Music video summary controller 270 stores each music video summary file 360 for each music video in memory 280. In response to receiving a user request, music video summary controller 270 is capable of accessing a particular music video summary file 360 and playing the music video summary file 360 (including audio and video portions) through television 105. Alternatively, music video summary controller 270 is capable of accessing a list 190 of all of the stored music video summary files 360 and displaying the list 190 on screen 110 of television 105. That is, list 190 displays (1) music video summary files of all the music videos that have been detected in the multimedia data stream; and (2) the identity of the artist or group that recorded each music video. The list 190 may optionally be presented in accordance with user preferences to personalize the content of the information presented in the list. Using remote control device 125 and IR sensor 160, the user sends a "play music video summary" control signal to music video summary controller 270 to select which music video summary file in list 190 to play next. In this manner the user selects the order in which the music video summary files are played.

Figure 5:
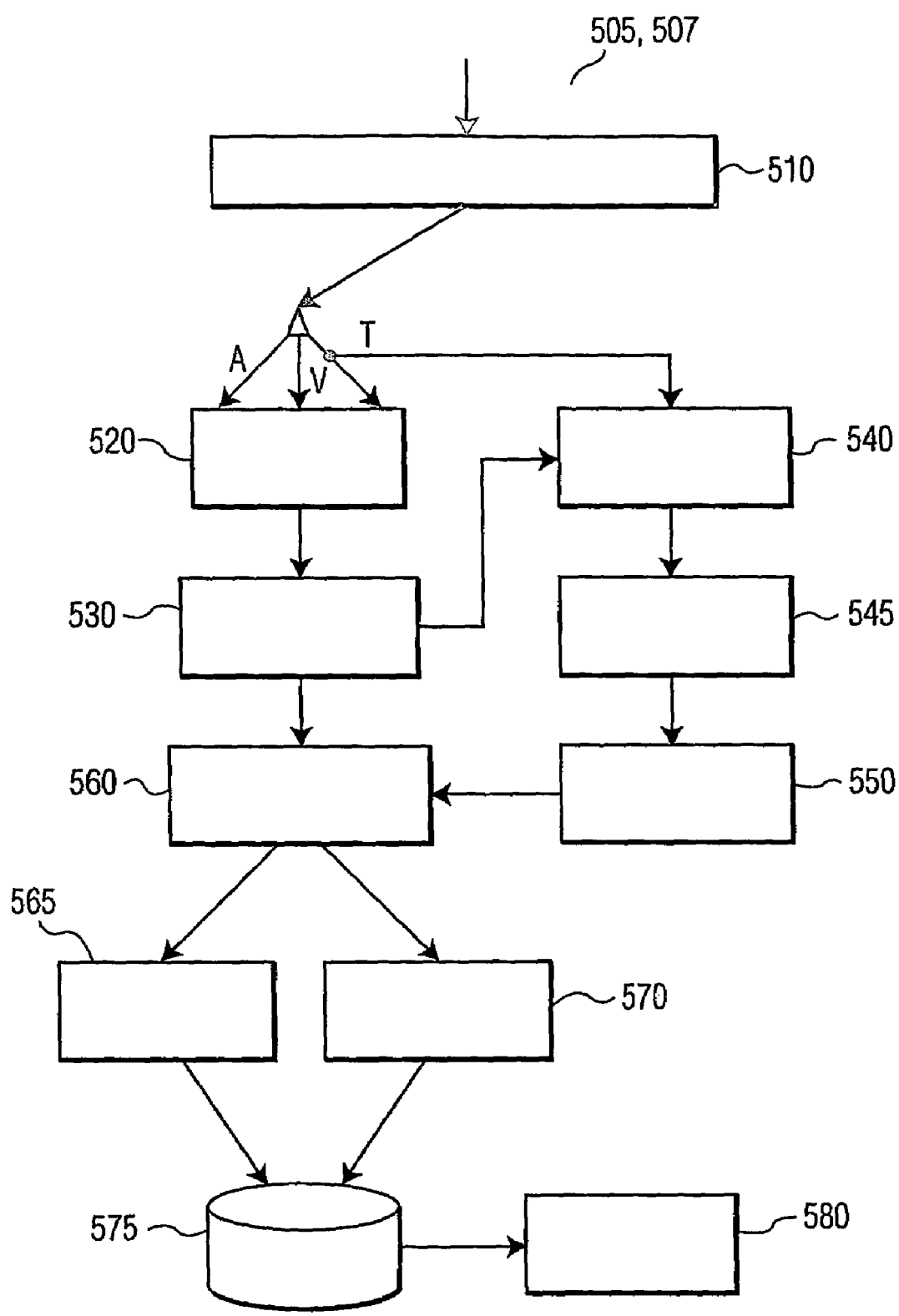
FIG. 5 is a flow chart illustrating an exemplary implementation of a music indexing and summarization process incorporating features of the present invention.

FIG. 5 is a flow diagram 500 providing an overview of the techniques employed by the present invention to index and summarize music videos. As shown in FIG. 5, the method music video summary controller 270 initially separates the received multimedia stream 505 containing music videos 507 into its audio, video and transcript components during step 510. The music video summary controller 270 then extracts a number of features, discussed further below, from the audio, video and transcript components during step 520. The transcript may be obtained, for example, from the close caption information, with time stamps inserted for each line of text by the software. At this point all the features comprise a time stamped stream of data without any indication of song boundaries.

The initial song boundary is determined during step 530 using the visual, auditory and textual features in a manner discussed further below in conjunction with FIGS. 10 and 11. Thereafter, using the initial boundaries and the transcript information, the chorus location and chorus key phrases are determined during step 540, as discussed further below in conjunction with FIG. 13. Based on the chorus information, information from a Web site is used to determine, for example, the title, artist name, genre and lyrics of the song during steps 545 and 550.

The song boundary is then confirmed during step 560 using, for example, one or more of the obtained song lyrics, audio classification, visual scene boundaries (based on color information) and overlaid text. The present invention takes into account that the lyrics on the Web site and the lyrics in the transcript do not always match perfectly. Based on the lyrics, the boundaries of the song are aligned using the initial boundary information and the lyrics. Alternatively, if transcript information is not available, the title page can be analyzed using optical character recognition (OCR) techniques on the extracted videotext in order to find the video information, such as artist name, song title, year and record label information and Web information can be used to verify the output from the OCR step. With this information, the lyrics of the song can be obtained from a Web site and a chorus detection method can be performed using textual information. (The concern here is that these downloaded lyrics are not time stamped and there is a problem of alignment) Preferably, the transcript is obtained using speech to text audio analysis. In one variation, the downloaded transcript and the transcript generated by the speech to text generator can be integrated to obtain a more accurate transcript.

Having the boundary for each song and the audiovisual features, the song is then summarized during steps 565 and 570, respectively, by determining the best representative frames, and the best video clip for the song summary, as discussed below in conjunction with FIG. 14. The best representative frames include close-ups from the artist, the title image with the song information, artist, label, album, and year. Song summaries are stored during step 575 in a song summary library. Users can access the program summaries during step 580, for example, using a web-based music video retrieval application.

Music video summarization in accordance with the present invention is based on the identification and summarization of individual songs. At a program level, the summary consists of the list of songs. At the next level, each song consists of title, artist, and selected multimedia elements that represent the song.

Boundary Detection

Music video summarization includes two types of boundary detection. First, song boundaries must be automatically detected. Thereafter, the boundary of the chorus must be detected. As discussed above in conjunction with FIG. 5, the present invention performs boundary detection using visual, audio and transcript features. The visual features include: presence of videotext, face detection (and/or identification), abrupt cuts and color histograms.

Boundary Detection Using Presence of Videotext

For a detailed discussion of suitable techniques for boundary detection employing the presence of videotext, see, for example, N. Dimitrova et al., "MPEG-7 VideoText Description Scheme for Superimposed Text," Int'l Signal Processing and Image Communications Journal (September, 2000), or U.S. patent application Ser. No. 10/176,239, filed Jun. 20, 2002, entitled "System and Method for Indexing and Summarizing Music Videos," each incorporated by reference herein.

The detection of videotext provides a reliable method for detecting boundaries, because the videotext information, such as artist and title, is presented at the start and end of each music video in a manner that makes it easy to read and recognize. Thus, the presence of videotext at the beginning of the song helps delineate the boundaries between songs. The videotext detection performance can be improved, for example, by ensuring that the text box contains song title information of the song, or that the text box is found in a given position, such as at the low left portion of the screen. The title page of the song can be used as one indicator that the song has already started in order to determine the beginning of the song Boundary Detection Using Face Detection (or Identification)

Figure 6:
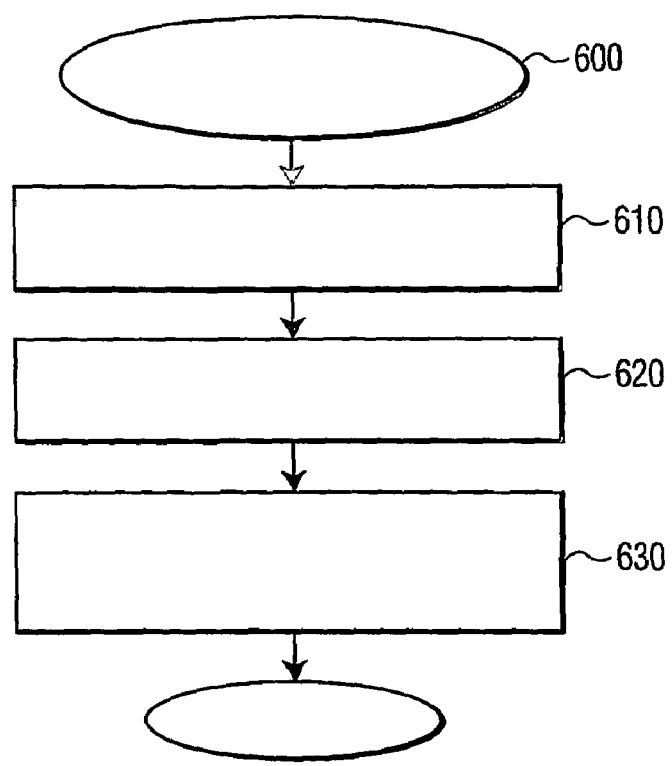
FIG. 6 is a flow chart of an exemplary face feature analysis process incorporating features of the present invention.

According to one aspect of the invention, the potential boundaries of the songs can be identified based on the detection of faces in image frames. FIG. 6 is a flow chart of an exemplary face feature analysis process 600 incorporating features of the present invention. As shown in FIG. 6, the face feature analysis process 600 initially assigns one of several possible face type labels to each image frame during step 610. For example, the face feature analysis process 600 may assign a label to each frame based on whether the frame consists primarily of a shoulder shot (S), full body shot (F), facial close up (C) or multiple people (M). An exemplary time line image of assigned face type labels is included in FIG. 12, discussed below. The image frames are then clustered during step 620 based on the assigned face type labels. Finally, patterns are analyzed in the clusters of face type labels during step 630 to detect video boundaries. Program control then terminates. The pattern analysis performed during step 630 is discussed further below in conjunction with FIGS. 10 and 11.

In this manner, over time, the face feature analysis process 600 will look for homogeneous image sequence patterns (suggesting that the frames are part of the same video). Deviations from such patterns will suggest that a new video or non-video material has started. For a detailed discussion of suitable techniques for performing face detection and labeling, see, for example, N. Dimitrova et al., "Video Classification Using Object Tracking, International Journal of Image and Graphics," Special Issue on Image and Video Databases, Vol. 1, No. 3, (August 2001), incorporated by reference herein.

Although faces are quite important for finding the main performing artist, it is noted that music videos is a challenging genre for performing video face detection. Face presence may not be properly detected in videos due to, for example, special effects and lighting with various colors. In addition, faces are often in a diagonal or horizontal position, for example, when the performers are dancing or sleeping.

In a further variation, facial identification can optionally be performed as well, to assign an identity label based on the artist identified in each frame, in a well known manner. The appearance of a new artist in an image sequence suggests the start of a new video. The performance of the facial identification can optionally be improved by employing a database containing facial images of popular or expected artists.

Boundary Detection Using Abrupt Cuts (Camera Changes)

Figure 7:
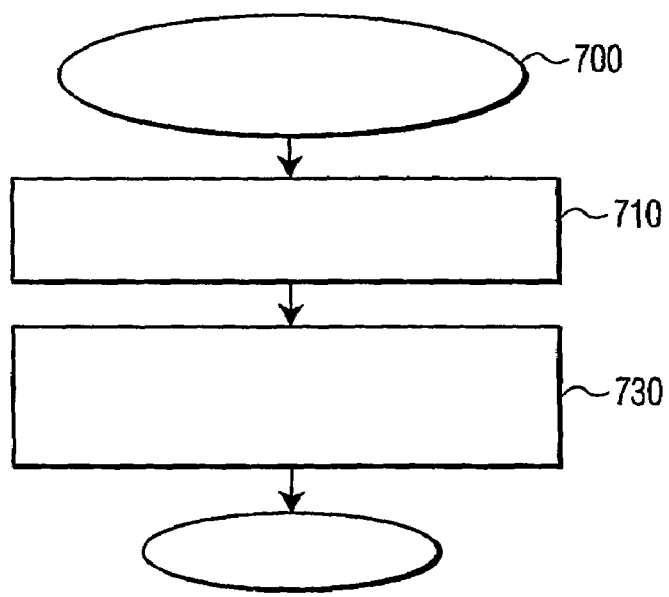
FIG. 7 is a flow chart of an exemplary camera change analysis process incorporating features of the present invention.

According to one aspect of the invention, the potential boundaries of the songs can be identified based on the detection of patterns of camera changes in image sequences. FIG. 7 is a flow chart of an exemplary camera change analysis process 700 incorporating features of the present invention.

As shown in FIG. 7, the camera change analysis process 700 initially determines a frequency of camera cuts in a video sequence during step 710. For a detailed discussion of suitable techniques for determining a frequency of camera cuts, see, for example, U.S. Pat. No. 6,137,544, entitled "Significant Scene Detection and Frame Filtering for a Visual Indexing System," incorporated by reference herein.

Thereafter, the camera change analysis process 700 analyzes patterns in the camera cut frequency data to detect video boundaries during step 730. The pattern analysis performed during step 730 is discussed further below in conjunction with FIGS. 10 and 11. It is noted that cut changes are very frequent in music videos. In fact, our data shows that average cut distance is higher during a commercial break than during the songs. This is quite unusual since for most other genres, the commercial breaks exhibit lower cut distance than the program. In a further variation, additional camera change labels can be provided to characterize the type of camera motions, such as pan, tilt and zoom.

Boundary Detection Using Color Histograms

Figure 8:
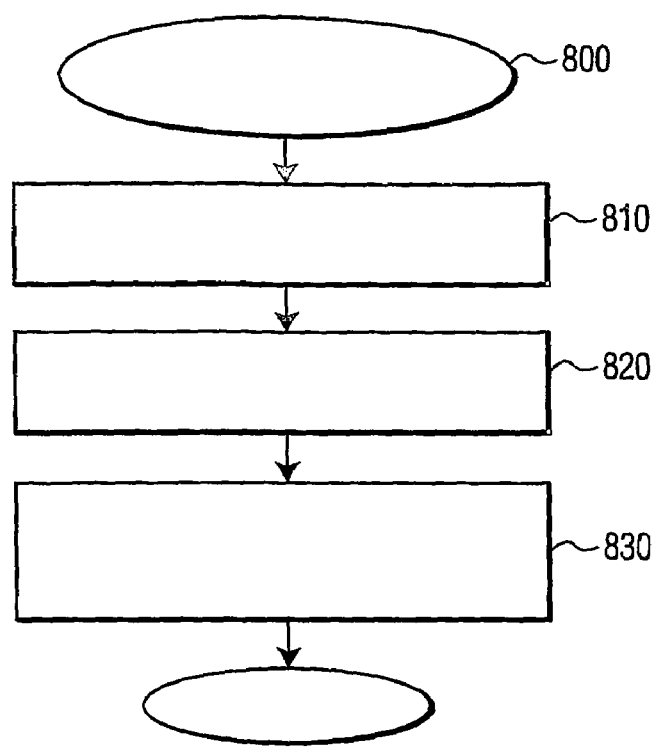
FIG. 8 is a flow chart of an exemplary color histogram analysis process incorporating features of the present invention.

According to another aspect of the invention, the potential boundaries of the songs can be identified based on color change features. A Superhistogram method is employed in the exemplary embodiment to infer the families of frames that exhibit similar colors. FIG. 8 is a flow chart of an exemplary color histogram analysis process 800 incorporating features of the present invention. As shown in FIG. 8, the color histogram analysis process 800 initially obtains color histograms for each image frame during step 810. Generally, a color histogram can be considered a signature that characterizes the color components of the corresponding frame. The image frames are then clustered during step 820 based on the histograms (as shown in FIG. 12). Finally, patterns are analyzed in the clusters of histograms during step 830 to detect video boundaries. Program control then terminates. The pattern analysis performed during step 830 is discussed further below in conjunction with FIGS. 10 and 11. The history of image frames that are considered during the clustering stage may be limited to, for example, one minute, since any prior frames with similar colors may not be relevant.

In this manner, over time, the color histogram analysis process 800 will look for homogeneous image sequence patterns (suggesting that the frames are part of the same video). Deviations from such patterns will suggest that a new video or non-video material has started. For example, a given song may have a dominant color throughout a video, due to the style of filming. In addition, the commercial breaks between each song will typically exhibit a different dominant color. The color histograms allow the families of frames that exhibit similar colors to be identified. Generally, as new songs appear, the color palette changes and frames of new songs are clustered into new families. Thus, the color histogram method is helpful in detecting the potential start and end of a music video.

For a more detailed discussion of color histograms, see, for example, L. Agnihotri and N. Dimitrova, "Video Clustering Using Superhistograms in Large Video Archives," Visual 2000, Lyon, France (November, 2000) or N. Dimitrova et al., "Superhistograms for Video Representation," IEEE ICIP, 1999, Kobe, Japan (1999), each incorporated by reference herein.

Boundary Detection Using Audio Features

Figure 9:
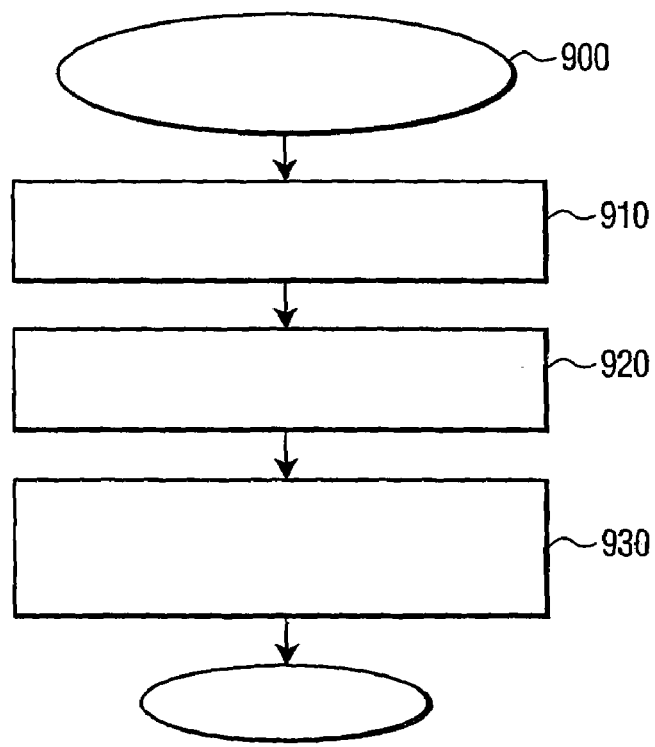
FIG. 9 is a flow chart of an exemplary audio feature analysis process incorporating features of the present invention.

According to another aspect of the invention, the potential boundaries of the songs can be identified based on audio features. FIG. 9 is a flow chart of an exemplary audio feature analysis process 900 incorporating features of the present invention. As shown in FIG. 9, the audio feature analysis process 900 initially assigns one of several possible audio type labels to each audio frame during step 910. It is noted that the duration of an audio frame may differ from the duration of an image frame. For example, the audio feature analysis process 900 may assign a label to each audio frame based on whether the audio frame primarily contains 1) music, 2) speech, 3) speech with background music, 4) multiple people talking, 5) noise, 6) speech with noise, 7) silence, 8) increasing volume or 9) decreasing volume. The audio frames are then clustered during step 920 based on the assigned audio type labels. Finally, patterns are analyzed in the clusters of audio type labels during step 930 to detect video boundaries. Program control then terminates. The pattern analysis performed during step 930 is discussed further below in conjunction with FIGS. 10 and 11. For example, the pattern analysis may look for silence at the beginning and ending of a song or the rising volume to indicate the start of a song, or decreasing volume to indicate the end of a song.

In this manner, over time, the audio feature analysis process 900 will look for homogeneous audio sequence patterns (suggesting that the audio frames are part of the same video). Deviations from such patterns will suggest that a new video or non-video material has started. For a detailed discussion of suitable techniques for performing audio segmentation and classification, see, for example, D. Li et al., "Classification of General Audio Data for Content-Based Retrieval," Pattern Recognition Letters 2000 (2000), incorporated by reference herein.

Boundary Detection Using Transcript Features

According to another aspect of the invention, the potential boundaries of the songs can be identified based on the audio transcript that may be obtained, for example, from the closed captioning information. Generally, paragraphs are identified in the textual transcript using a keyword analysis (or autocorrelation analysis). In particular, a histogram of words is obtained and analyzed to detect new songs. The identification of a new set of keywords will suggest that a new video or non-video material has started. For a detailed discussion of suitable techniques for performing transcript "paragraphing," see, for example, N. Stokes et al., "Segmenting Broadcast News Streams Using Lexical Chains," Proc. of Starting Artificial Intelligence Researchers Symposium (STAIRS) (2002), incorporated by reference herein.

Boundary Detection Using Low Level Features

In addition to the above-described features, the present invention can also directly use a number of low level features derived directly from the content, such as the number of edges or shapes in each image frame or local and global motion, and monitor any patterns and deviations from such patterns in these low level features. In addition, low level audio features can be analyzed as well, such as mel frequency cepstral coefficients (MFCC), linear predictive coefficient (LPC), pitch variations, bandwidth, volume and tone.

Analysis of Visual, Audio and Transcript Features

As previously indicated, the present invention performs boundary detection using visual, audio and transcript features, which have been described above in conjunction with FIGS. 5 through 9. In one exemplary embodiment, shown in FIG. 10, the visual, audio and transcript features are monitored using a pattern recognition engine, such as a Bayesian Belief Network (BBN) 1000, to segment the video stream into individual videos. In an alternate embodiment, shown in FIG. 11, the visual, audio and transcript features are processed using a rule-based heuristics process 1100 to segment the video stream into individual videos. Generally, both exemplary embodiments segment the videos using the approximate boundaries from all the different features discussed above.

Figure 10:
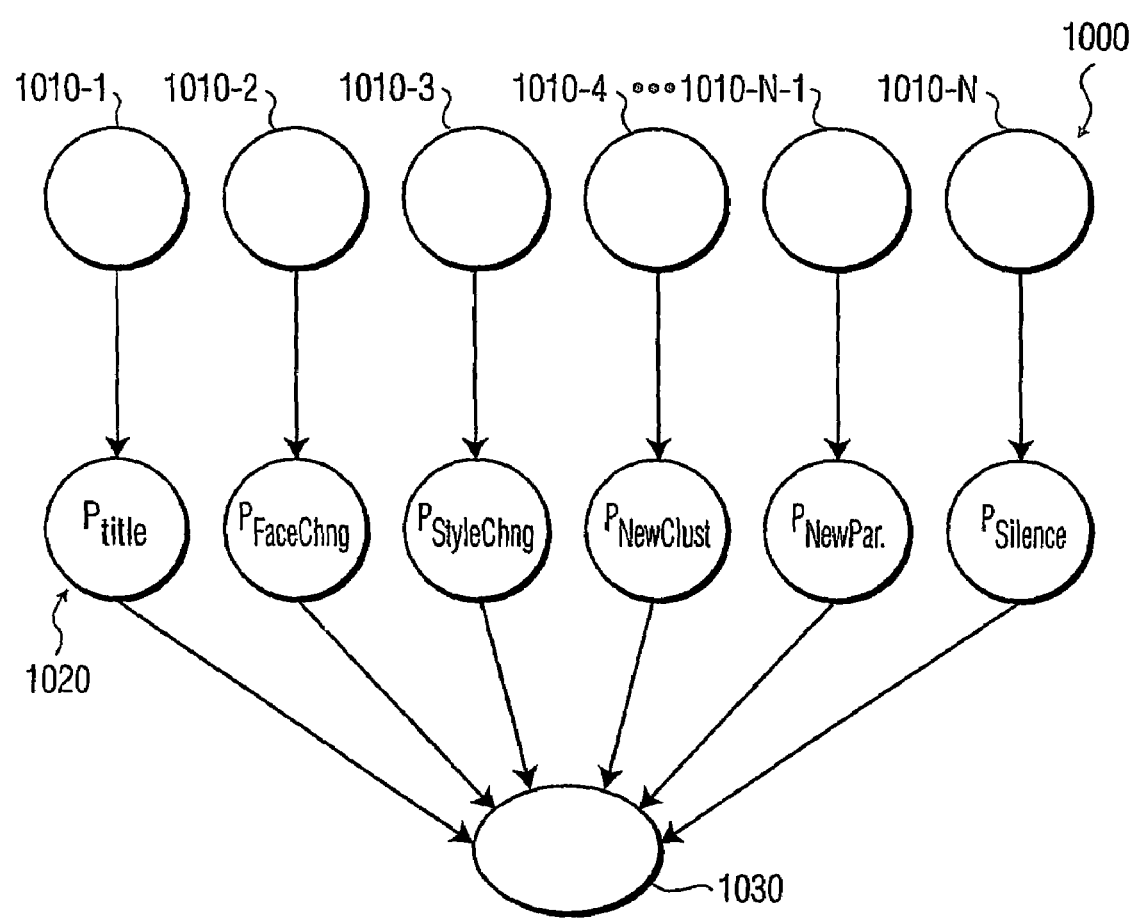
FIG. 10 illustrates an exemplary Bayesian Belief Network incorporating features of the present invention.

FIG. 10 illustrates an exemplary Bayesian Belief Network 1000 incorporating features of the present invention. The Bayesian BeliefNetwork 1000 monitors the visual, audio and transcript features to segment the video stream into individual videos. Generally, Bayesian Belief Networks have been used to recognize complex patterns and to learn and recognize predefined activities. The Bayesian Belief Network 1000 is trained using video sequences that have already labeled with segmentation information, in a known manner.

As shown in FIG. 10, the Bayesian Belief Network 1000 includes first layer 1010 having a plurality of states 1010-1 through 1010-N, each associated with a different feature that is monitored by the present invention. The input for each state is an average feature value over a given window. For example, for the face presence feature, the input may be, for example, whether there is a change in the number of faces in each image over a current 20 second window compared to a previous 20 second window. Similarly, for the color histogram feature, the input may be, for example, whether a new cluster has been detected in the current window.

The Bayesian BeliefNetwork 1000 includes a second layer 1020 that for each corresponding state determines the probability that the current time window corresponds to a transition, $P_{trans}$, associated with the start or end of a video based on the single feature associated with the state. For example, the probability $P_{facechng}$, indicates the probability of a face change as suggested by the face change feature data. In the final level 1030, the Bayesian Belief Network 1000 uses the use Bayesian inference to determine whether or not there was a song break based on the probabilities across each of the monitored features. In further variations, neural networks or Auto Regressive Moving Average (ARMA) techniques may be employed to predict song boundaries.

The conditional probability for determining whether the current time window corresponds to a segment at state 1030 can be computed as follows.

$$P(x|e^\varphi) = \sum_{\varphi_{mn}} P(x|\varphi_{mn}) \prod_{i=1}^{|\varphi|} P(\varphi_i|e)$$

The above equation gives the general case for computing the conditional probability. For the model given in FIG. 10, the probability can be calculated as follows:

$$P(x_i|e^\varphi) = \sum_{\varphi_{mn}} P(x_i, v, f, a, c, t, a)$$
$$= \sum_{\varphi_{mn}} p(x_i|v)P(v)p(x_i|f)P(f)p(x_i|a)P(a)p(x_i|c)$$
$$P(c)p(x_i|t)P(t)p(x_i|a)P(a)$$

where v is VideoText, f is faces, a is abrupt cuts, c is color, t is transcript and a is audio related analysis.

Figure 11:
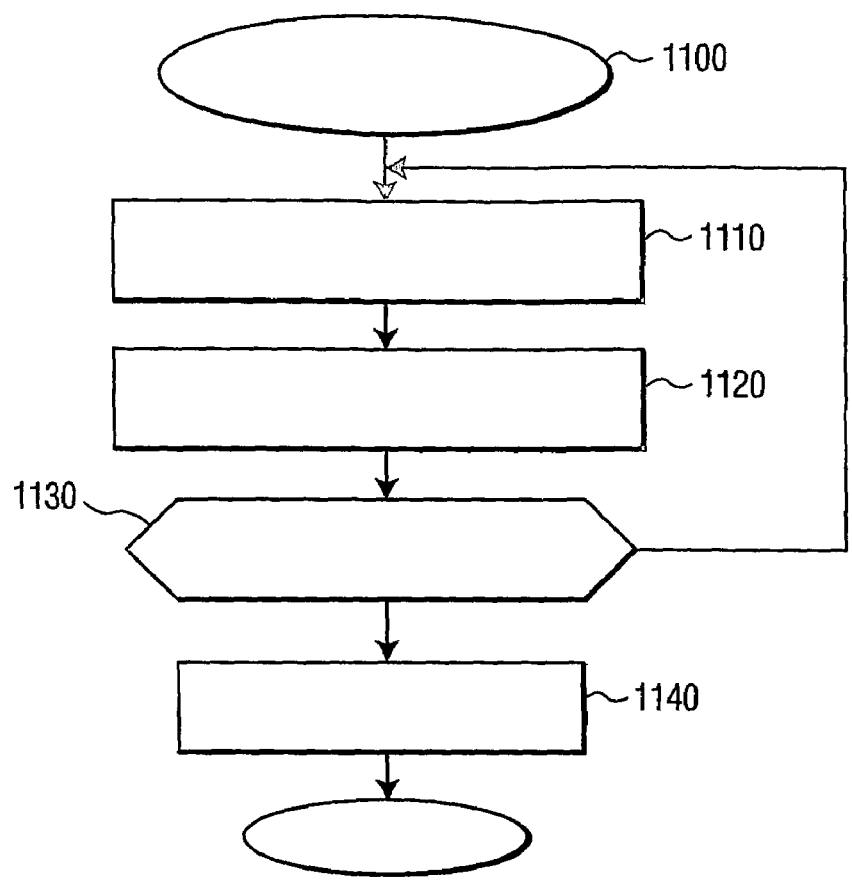
FIG. 11 is a flow chart describing an exemplary implementation of a video segmentation process.

FIG. 11 is a flow chart describing an exemplary implementation of a video segmentation process 1100. As previously indicated, the video segmentation process 1100 processes the visual, audio and transcript features using a rule-based heuristics technique to segment the video stream into individual videos. As shown in FIG. 11, the video segmentation process 1100 initially evaluates the monitored video, audio and transcript feature values during step 1110. Thereafter, the video segmentation process 1100 applies one or more predefined video segmentation rules 1115 to the feature values during step 1120. For example, a given application may define a video segmentation rule that specifies a video segment should be identified if the probability values for videotext presence and color histogram feature both exceed a predefined threshold. In a further example, a video segmentation rule can specify that a video segment should be identified if the probability values for videotext presence and at least N other monitored features exceed predefined thresholds.

A test is performed during step 1130 to determine if a new video is detected. If it is determined during step 1130 that a new video has not been detected, then program control returns to step 1110 to continue monitoring the image stream in the manner described above. If, however, it is determined during step 1130 that a new video has been detected, then the new video segment is then identified during step 1140. Program control can then terminate or return to step 1110 to continue monitoring the image stream in the manner described above, as appropriate.

The processing of the monitored features by the Bayesian Belief Network 1000 or the video segmentation process 1100 can consider the fact that the transcript starts later than the visual and audio streams. From visual point of view, the videotext title page is also obtained which normally appears a few seconds after the start of the song. The begin boundary is aligned with the visual color boundaries for the song and the start of music classification in the audio domain.

FIG. 12 provides exemplary time line images of assigned face type labels 1210, color histogram clusters 1220 and videotext presence 1230. As shown in FIG. 12, the feature data for each of the monitored features are aligned in order to detect video segments. The present invention employs the Bayesian Belief Network 1000 or video segmentation process 1100 to identify a transition 1240 between two videos or between a video and non-video material based on the transitional periods suggested by each individual feature.

Chorus Detection

In order to determine the chorus of a song, previous research has centered on music audio features. A common approach in order to find repeated segments in songs is to perform auto-correlation analysis. A chorus is repeated at least twice in popular songs. It is usually repeated three or more times in most songs.

According to a further feature of the present invention, the chorus of a song is detected using the transcript (closed caption information). Generally, a chorus is identified by detecting the sections of the song that contains repeated words. It is noted that closed captions are not perfect, and may contain, for example, typographical errors or omissions. FIG. 13 is a flow chart of an exemplary implementation of a chorus detection process 1300. As shown in FIG. 13 and discussed hereinafter, a chorus detection process 1300 recognizes chorus segments, by performing key-phrase detection on the closed captions during step 1310, potential chorus detection during step 1320, chorus candidate confirmation during step 1330 and irregular chorus detection and post analysis during step 1340. Finally, an autocorrelation analysis is performed during step 1350 to identify any chorus(es).

Keyphrase Identification (Step 1310)

A chorus contains the lyrics in a song that are repeated most often. By detecting and clustering the phrases, the temporal location of the chorus segments can be identified. To select potential sections containing a chorus a tally (count) of phrases present in a song is compiled. These phrases are taken from the transcript and represent either a whole line of text on the television screen or parts of a line that have been broken up by delimiters such as a comma or period. For each new phrase, it is determined whether the phrase exists in the tally and increment the counter for that phrase. If not, a new bin is created for the new phrase and the counter is initialized to one for that bin. This process is repeated for all the text for each of the songs. At the end of the song, the repeating phrases are designated as key phrases.

Candidate Chorus Detection (Step 1320)

Potential candidates for a chorus segment are those that contain two or more occurrences of key phrases. In order to find these segments, the timestamps at which each of the key phrases occurs are identified. For each timestamp of a key phrase, a potential chorus is designated. If this potential chorus is within n seconds of another chorus then they are merged. Based on an examination of a number of songs it is assumed that choruses are rarely more than 30 seconds long (n=30).

Chorus Candidate Confirmation (Step 1330)

Only those candidates which contain two or more key phrases are selected as choruses. If more than three choruses are selected, then the three choruses that have the highest density of key phrases, which is defined as follows, are determined:

$$\text{Density} = \frac{\text{Number of Keyphrases in the Chorus}}{\text{Duration of the Chorus}}$$

Irregular Chorus Detection and Post Analysis (Step 1340)

For the summarization, only one chorus needs to be correctly determined. The "key-chorus" that will be presented to the users is identified. There is a large variability within a song regarding the duration of different choruses (15 to 30 seconds is not uncommon). This variability makes it challenging to predict the location and length of choruses. The chorus that is of medium length of the three choruses is selected. The first chorus may be preferred to the rest of the choruses to also get a "lead" into the song along with the first chorus. Also, the placement of chorus within a song is variable. The final chorus analysis is used to select a chorus that has a reasonable distance from other choruses.

Autocorrelation Analysis (Step 1350)

In audio content analysis, researchers have used auto-correlation in order to find the chorus. See, for example, J. Foote, "Visualizing Music and Audio Using Self Similarity," Proc. ACM Multimedia '99, 77-80, Orlando, Fla. (November, 1999), incorporated by reference herein. Autocorrelation analysis is used by the present invention on the transcript to visualize the structure of a song. In order to find the autocorrelation function, all the words in the transcript are laid out in two dimensions and fill up the matrix with ones and zeroes depending on whether the words on both the dimensions are the same. This matrix is then projected diagonally to determine the peaks in this view, which now give an indication of where the choruses occur in the song.

Music Video Summary

A music video summary consists of content elements derived from the video in different media (audio, video, and transcript). In an exemplary implementation, Bayesian Belief Networks are employed to capture the generic content elements of a music video as well as the transitions of the music events and capture the structure of the composition. BBNs can be used to model songs, for example, as having instrumental plus verse (V) and chorus (C) events. The order of musical events in a given song may be, for example, V V C V C C. Many songs have, however, may have a more complex structure, such as a bridging section between the chorus and the verse, and in many songs there is not even repeating chorus, but the whole song is one single monolithic verse. With the BBN approach even if one of the musical events is missing, a reasonable summary is still obtained.

FIG. 14 shows a Bayesian Belief Network 1400 that can be used to model the function that is used to find the elements from the video that make up the summary. The conditional probability for determining the important segment can be computed as follows.

$$P(x|e^{\varphi}) = \sum_{\varphi_{mn}} P(x|\varphi_{mn}) \prod_{i=1}^{|\varphi|} P(\varphi_i|e)$$

The above equation gives the general case for computing the conditional probability. For the model given in FIG. 14, the probability can be calculated as follows:

$$P(x_i|e^{\varphi}) = \sum_{\varphi_{mn}} P(x_i, t, c, h, m)$$

$$= \sum_{\varphi_{mn}} p(x_i|t)P(t)p(x_i|c)P(c)p(x_i|h)P(h)p(x_i|m)P(m)$$

where $\varphi=\{\text{title, closeup, chorus, music}\}$.

The value of m is four (4) as there are four media elements in the exemplary embodiment The value of n varies for each of the media elements depending on number of values that the probabilities can take. For example, the value for P(title) could be a value between 0 and 1 with steps of 0.1 depending on the percentage of the image that is covered with text. Thus, n here is 10. Conceivably, additional features can be included, such as motion, audio-texture, and lead instrument/singer highlight, in the parent nodes.

A selection criterion decides the content to be presented in the summary for each of the media elements. The summary is the output from the selection functions that are defined as follows.

$$\psi_{Visual} P(x|e^{\varphi}) = \begin{cases} 1 & \text{if} \quad \begin{aligned} & P(x_i|e^{\varphi}) \geq \theta_1 \\ & \& P(vtext) \geq \theta_2 \\ & \& P(\text{face}) \geq \theta_3 \end{aligned} \\ 0 & \text{if} \quad P(x_i|e^{\varphi}) < \theta_1 \end{cases}$$

$$\psi_{Audio} P(x|e^{\varphi}) = \begin{cases} 1 & \text{if} \quad \begin{aligned} & P(x_i|e^{\varphi}) \geq \theta_1 \\ & \& P(\text{music}) \geq \theta_4 \end{aligned} \\ 0 & \text{if} \quad P(x_i|e^{\varphi}) < \theta_1 \end{cases}$$

$$\psi_{Transcript} p(x|e^{\varphi}) = \begin{cases} 1 & \text{if} \quad \begin{aligned} & P(x_i|e^{\varphi}) \geq \theta_1 \\ & \& P(\text{chorus}) \geq \theta_5 \end{aligned} \\ 0 & \text{if} \quad P(x_i|e^{\varphi}) < \theta_1 \end{cases}$$

The summary of a music video is a set consisting of the output of all the above selection functions:

$$S=\{\psi_{Audio}P(x|e,\wp), \psi_{Video}P(x|e,\wp), \psi_{Transcript}P(x|e,\wp)\}$$

In addition to these elements derived from the video, high level information can be added, such as, artist, title and album. This high level information can be extracted, for example, from the Internet to complete the summary.

Of course, Bayesian Belief Networks are just one way to model the selection of important elements for the summary. One can think of applying Sundaram's Utilization Maximization Framework, as described in H. Sundaram et al., "A Utility Framework for the Automatic Generation of Audio-Visual Skims," ACM Multimedia 2002, Juan Les Pin (Dec. 1-5, 2002), or Ma's user attention model for summarization, as described in Yu-Fei Ma et al. "A User Attention Model for Video Summarization," ACM Multimedia 2002, Juan Les Pin (Dec. 1-5, 2002). These models are generative models for summarization. They model what the designer of the algorithm decides is important. Unsupervised machine learning techniques can be applied for music video visualization and summarization to find inherent structural patterns and highlights.

The summary can be personalized for both the user interface and the type of information shown. The users can choose the type of interface they would like to receive the summary in and the particular content of a presented summary. Differences such as less information or more information and placement of the information can be altered based on user settings. The users can also choose what should be included in the summary. Users can fill out a short survey to indicate the type of information they would like to see.

As is known in the art, the methods and apparatus discussed herein may be distributed as an article of manufacture that itself comprises a computer readable medium having computer readable code means embodied thereon. The computer readable program code means is operable, in conjunction with a computer system, to carry out all or some of the steps to perform the methods or create the apparatuses discussed herein. The computer readable medium may be a recordable medium (e.g., floppy disks, hard drives, compact disks, or memory cards) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk.

The computer systems and servers described herein each contain a memory that will configure associated processors to implement the methods, steps, and functions disclosed herein. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

It is to be understood that the embodiments and variations shown and described herein are merely illustrative of the principles of this invention and that various modifications may be implemented by those skilled in the art without departing from the scope and spirit of the invention.

What is claimed is:

1. A method for segmenting a music video in a multimedia stream, said method comprising the steps of:
   receiving a multimedia stream including at least one music video;
   using a processor for segmenting said at least one music video from said multimedia by evaluating a plurality of content features related to said multimedia stream; and
   identifying said at least one music video, wherein said plurality of content features includes a face presence feature to evaluate patterns in the presentation of faces in said multimedia stream.

2. The method as claimed in claim 1, wherein said method further comprises the step of:
   generating a summary of said at least one music video.

3. The method as claimed in claim 1, wherein said summary of said at least one music video is presented to a user based on personalized preferences.

4. The method as claimed in claim 1, wherein said at least one music video may be retrieved by a user based on personalized preferences.

5. The method as claimed in claim 1, wherein said plurality of content features are processed using a pattern recognition engine to identify said at least one music video.

6. The method as claimed in claim 1, wherein said plurality of content features are processed using a Bayesian Belief Network to identify said at least one music video.

7. The method as claimed in claim 1, wherein said plurality of content features are processed using one or more video segmentation rules to identify said at least one music video.

8. The method as claimed in claim 1, wherein said plurality of content features further includes a videotext presence feature that determines when videotext appears in said multimedia stream.

9. The method as claimed in claim 1, wherein said plurality of content features further includes a color histogram feature to evaluate patterns in the color content of said multimedia stream.

10. The method as claimed in claim 1, wherein said plurality of content features further includes a camera cut feature to evaluate patterns in the camera cuts and movements in said multimedia stream.

11. A method for segmenting a music video in a multimedia stream, said method comprising the steps of:
    receiving a multimedia stream including at least one music video;
    using a processor for segmenting said at least one music video from said multimedia stream by evaluating a plurality of content features related to said multimedia stream; and
    identifying said at least one music video, wherein said plurality of content features includes an analysis of key words obtained from a transcript of said at least one music video.

12. The method as claimed in claim 1, wherein said plurality of content features further includes an analysis of low level features derived directly from said multimedia stream.

13. The method as claimed in claim 12, wherein said low level features include one or more of a number of edges or shapes or local or global motion.

14. The method as claimed in claim 1, wherein said plurality of content features further includes an audio feature.

15. The method as claimed in claim 14, wherein said audio feature evaluates a volume of said multimedia stream.

16. The method as claimed in claim 14, wherein said audio feature evaluates one or more of a mel frequency cepstral coefficient (MFCC), linear predictive coefficient (LPC), or variations in pitch bandwidth, volume or tone.

17. The method as claimed in claim 1, wherein said method further comprises the step of:
   obtaining identifying information for said at least one music video from an external source.

18. A method for detecting a chorus in at least one music video, said method comprising the steps of:
   receiving a multimedia stream including said at least one music video;
   accessing a transcript associated with said at least one music video; and
   detecting said chorus based upon a repetition of words in said transcript.

19. The method as claimed in claim 18, wherein said transcript is obtained from closed caption information.

20. The method as claimed in claim 18, wherein said chorus is employed for an automatic generation of a summary of said at least one music video.

21. The method as claimed in claim 18, wherein said method further comprising the steps of:
   detecting said repeated words; and
   clustering said repeated words.

22. The method as claimed in claim 18, wherein said detecting step is further based upon additional content features related to said multimedia stream.

23. The method as claimed in claim 18, wherein said method further comprising the step of:
   obtaining identifying information for said at least one music video from an external source.

24. An apparatus for segmenting a music video in a multimedia stream, said apparatus comprising:
   a memory; and
   at least one controller (270), coupled to the memory (280), operative to:
   receive a multimedia stream including at least one music video;
   apply a plurality of content features related to said multimedia stream to a pattern recognition engine to segment said at least one music video from said multimedia stream; and
   identify said at least one music video, wherein said plurality of content features includes a face presence feature and at least one of: a videotext presence feature; a color histogram feature; a camera cut feature; and an analysis of key words obtained from a transcript of said at least one music video.

25. The apparatus as claimed in claim 24, wherein said pattern recognition engine is a Bayesian Belief Network.

26. The apparatus as claimed in claim 24, wherein said pattern recognition engine is a neural network.

27. The apparatus as claimed in claim 24, wherein said pattern recognition engine employs an Auto Regressive Moving Average technique.

28. An apparatus for segmenting a music video in a multimedia stream, said apparatus comprising:
   a memory; and
   at least one controller, coupled to the memory, operative to:
   receive a multimedia stream including at least one music video;
   apply a plurality of content features related to said multimedia stream to one or more video segmentation rules to segment said at least one music video from said multimedia stream; and
   identify said at least one music video, wherein said plurality of content features includes a face presence feature and at least one of: a videotext presence feature; a color histogram feature; a camera cut feature; and an analysis of key words obtained from a transcript of said at least one music video.

29. The apparatus as claimed in claim 28, wherein said one or more video segmentation rules define a threshold for said plurality of content features to determine when a video segment has occurred.

* * * * *